(12) United States Patent
Moyer et al.

(10) Patent No.: US 7,096,348 B2
(45) Date of Patent: Aug. 22, 2006

(54) METHOD AND APPARATUS FOR ALLOCATING ENTRIES IN A BRANCH TARGET BUFFER

(75) Inventors: William C. Moyer, Dripping Springs, TX (US); Jeffrey W. Scott, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 164 days.

(21) Appl. No.: 10/736,393

(22) Filed: Dec. 15, 2003

(65) Prior Publication Data

US 2005/0132173 A1 Jun. 16, 2005

(51) Int. Cl.
G06F 9/00 (2006.01)
(52) U.S. Cl. .................... 712/238; 712/237
(58) Field of Classification Search .......... 712/238, 712/237
See application file for complete search history.

(56) References Cited

U.S. PATENT DOCUMENTS

| | | | |
|---|---|---|---|
| 5,701,448 A | 12/1997 | White | |
| 5,835,754 A * | 11/1998 | Nakanishi | 712/239 |
| 5,909,566 A | 6/1999 | Cai et al. | |
| 5,996,071 A | 11/1999 | White | |
| 6,154,833 A | 11/2000 | Murty | |
| 6,157,988 A | 12/2000 | Dowling | |
| 6,157,998 A * | 12/2000 | Rupley et al. | 712/238 |
| 6,308,322 B1 | 10/2001 | Serocki et al. | |
| 6,477,640 B1 | 11/2002 | Rupley, II et al. | |

OTHER PUBLICATIONS

PCT/US04/37627—International Search Report.

* cited by examiner

*Primary Examiner*—Eddie Chan
*Assistant Examiner*—Aimee J. Li
(74) *Attorney, Agent, or Firm*—Daniel D. Hill

(57) ABSTRACT

A method (200) and apparatus (100) for allocating entries in a branch target buffer (BTB) (144) in a pipelined data processing system includes: sequentially fetching instructions; determining that one of the instructions is a branch instruction (210, 215, 220); decoding the branch instruction to determine a branch target address; determining if the branch target address can be obtained without causing a stall condition in the pipelined data processing system; and selectively allocating an entry of the BTB (144) based on the determination. In one embodiment, an entry of the BTB (144) is allocated if the branch instruction is not loaded into a predetermined slot (S1) of a prefetch buffer (102) and no other stall condition will occur. The method (200) and apparatus (100) combine the advantages of using a BTB (144) and branch lookahead to reduce stall conditions in the data processing system.

21 Claims, 7 Drawing Sheets

METHOD AND APPARATUS FOR ALLOCATING ENTRIES IN A BRANCH TARGET BUFFER

FIELD OF THE INVENTION

The present invention relates generally to data processing systems, and more specifically, to allocating entries in a branch target buffer.

RELATED ART

Branch target buffers have been used extensively to improve processor performance by reducing the number of cycles spent in execution of branch instructions. Branch target buffers act as a cache of recent branches and accelerate branches by providing either a branch target address (address of the branch destination) or one or more instructions at the branch target prior to execution of the branch instruction, which allows a processor to more quickly begin execution of instructions at the branch target address.

Branch lookahead schemes are also used to accelerate branch processing, and operate by scanning ahead into the sequential instruction stream, looking for upcoming branch instructions in advance of their execution, and computing branch target addresses of branches early, to allow branch target instructions to be fetched in advance of branch instruction execution, in case the branch is taken.

Branch prediction logic may be used with both BTB and branch lookahead schemes to allow for an early prediction of the outcome (taken or not taken) of a conditional branch, prior to the resolution of the branch condition, thus allowing for increased branch performance when accuracy of the predictor is high.

Many current branch target buffer designs use an allocation policy that allocates an entry for every branch instruction encountered in the instruction stream. This approach tends to be inefficient, since not taken branches are likely to be not taken in the future, and allocating an entry for them may displace future taken branch entries, thus lowering the hit rate of the branch target buffer.

Another approach waits to allocate an entry in the branch target buffer until it is known that a branch is actually taken, since a not-taken branch has a high probability of not being taken on the next execution. For larger branch target buffers, this may be a reasonable approach, however, for low-cost systems where the size of the branch target buffer must be minimized, an improved method of allocating new entries in the branch target buffer is desired.

Therefore, a need exists for an improved BTB design that is more efficient and more cost effective.

BRIEF DESCRIPTION OF THE DRAWINGS

The present invention is illustrated by way of example and not limited by the accompanying figures, in which like references indicate similar elements, and in which.

Figure 1:
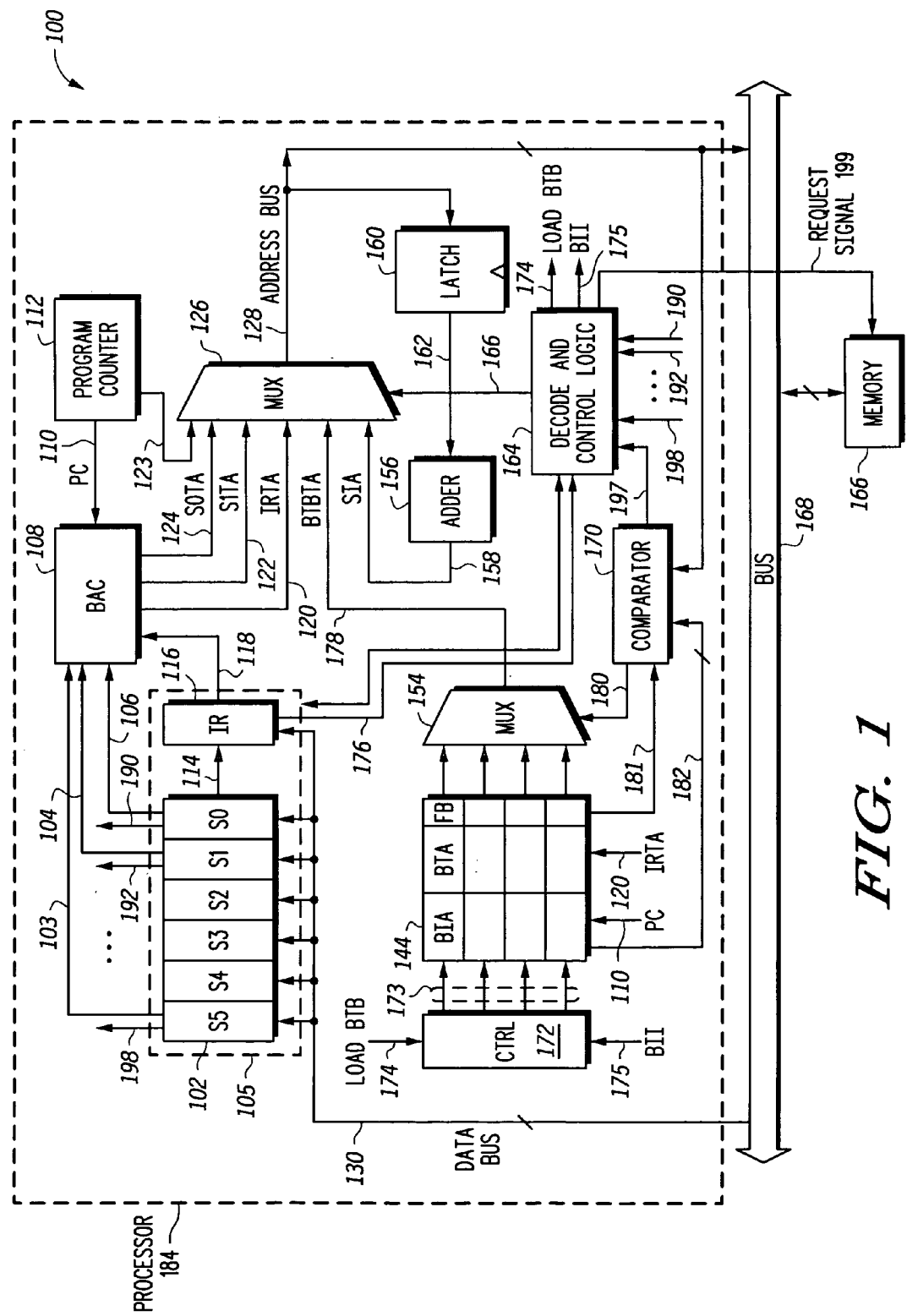
FIG. 1 illustrates, in block diagram form, a data processing system in accordance with one embodiment of the present invention.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION OF THE DRAWINGS

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Therefore, each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one.

Brackets are used to indicate the conductors of a bus or the bit locations of a value. For example, "bus 60 [0-7]" or "conductors [0-7] of bus 60" indicates the eight lower order conductors of bus 60, and "address bits [0-7]" or "ADDRESS [0-7]" indicates the eight lower order bits of an address value. The symbol "$" preceding a number indicates that the number is represented in its hexadecimal or base sixteen form. The symbol "%" preceding a number indicates that the number is represented in its binary or base two form.

One embodiment of the present invention seeks to provide an improved BTB design by utilizing branch lookahead outcomes to condition the allocation of entries in the BTB based on the result of the branch lookahead. Yet another embodiment of the present invention seeks to provide an improved BTB design by utilizing processor stall information to condition the allocation of entries in the BTB based on the estimated benefit of performing such allocation.

FIG. 1 illustrates, in block diagram form, a data processing system 100 in accordance with one embodiment of the present invention. Data processing system 100 includes memory 166, bus 168, and processor 184. Data processing system 100 may include other elements than those illustrated, or may include more or fewer elements than those illustrated. For example, data processing system 100 may include any number of memories, peripheral devices, or processors.

Processor 184 includes an instruction register (IR) 116, a branch address calculator (BAC) 108, a program counter 112, a multiplexer (MUX) 126, a latch 160, an adder 156, a multiplexer (MUX) 154, a branch target buffer (BTB) 144, decode and control logic (DCL) 164, instruction buffer 105, comparator 170, control logic 172, and prefetch buffer 102. Prefetch buffer 102 includes instruction slots S0, S1, S2, S3, S4, and S5. Instruction buffer 105 includes prefetch buffer 102 and instruction register 116. Processor 184 may be any type of processor, such as, for example, a microprocessor, microcontroller, digital signal processor, etc. In one embodiment, processor 184 may be referred to as a processor core. In another embodiment, processor 184 may be one of many processors in a multi-processor data processing system. Furthermore, processor 184 may be a pipelined processor.

In one embodiment of data processing system 100, prefetch buffer 102 is coupled to BAC 108, DCL 164, instruction register 116, and bus 168. BAC 108 is coupled to MUX 126, program counter 112, prefetch buffer 102, and instruction register 116. Mux 126 is coupled to program counter 112, BAC 108, MUX 154, adder 156, latch 160, and bus 168. BTB 144 is coupled to CTRL 172, comparator 170, and MUX 154. Comparator 170 is coupled to MUX 154, BTB 144, address bus 128, and DCL 164. DCL 164 is coupled to MUX 126, instruction register 116, comparator 170, prefetch buffer 102, memory 166, and CTRL 172. Memory 166 is coupled to bus 168 and DCL 164.

In one embodiment of the present invention, memory 166 contains a sequence of instructions, each instruction having a corresponding instruction address. During a clock cycle of processor 184, DCL 164 determines whether instruction buffer 105 has a predetermined number of slots available to store a predetermined number of instructions from memory 166. DCL 164 is able to determine whether there will be a predetermined number of slots available in instruction buffer 105 by using the fact that DCL 164 is cognizant of the size of prefetch buffer 102, the number of reserved slots in instruction buffer 105, and the number of instructions currently being fetched from memory via bus 168. The predetermined number of slots may vary depending upon the pipelined processor being used and is dependent on the number of instructions fetched and the size of the each instruction being fetched. For the embodiments described herein, assume the pipelined processor uses a doubleword fetch size, the predetermined number of slots is two, and the predetermined number of instructions being fetched is two, i.e., two word size instructions are requested during each doubleword instruction fetch. Alternate embodiments may use different number of prefetch slots, may have a different pipeline, and may have different fetch sizes and memory latency than the embodiments described herein.

In at least one embodiment of the present invention, prefetch buffer 102 is used to hold sequential instructions in advance of their execution by processor 184. Instruction register 116 is used to hold the current instruction being decoded for execution. As instructions are executed, subsequent instructions are provided to instruction register 116 by way of conductors 114 from prefetch buffer slot 0, or from data bus 130. As these instructions advance through the pipeline, fetched instructions are shifted into slot 0 from slot 1, are shifted into slot 1 from slot 2, and so forth, assuming valid instructions are present in a previous slot. Empty slots in prefetch buffer 102 may be filled with requested instructions fetched from memory 166 by way of bus 168 and data bus 130.

In at least one embodiment of the present invention, prefetch buffer 102 allows for decoupling of memory from instruction register 116, and acts as a FIFO of instructions. As long as the instruction execution stream remains sequential without a change of instruction flow, instructions continue to be requested sequentially and supplied to prefetch buffer 102. When a change of flow occurs, the sequential instruction stream must be discarded, and prefetch buffer 102 is flushed of unused sequential instructions and is filled with a new stream of instructions from the target location of the change of flow. Branch instructions are typically used in processor 184 to cause a change of flow to occur to a new instruction stream, although additional events such as interrupts and exception processing may also cause a change of flow to occur. Change of flow events cause a disruption in the normal execution of instructions in processor 184 since the current instruction stream is discarded, and a new instruction stream established. This typically causes processor 184 to stall instruction execution for one or more cycles while waiting for the new instruction stream to be established, thus lowering overall performance and efficiency of data processing system 100.

Another advantage of prefetch buffer 102 is that the contents of the buffer may be scanned to determine the presence of a branch instruction which may cause a change of flow, in advance of the execution of the branch instruction by processor 184. By examining the instruction stream in advance of execution, it is possible that a branch instruction may be detected early enough before it is executed that the target instruction stream can be established without causing processor 184 to stall, thus improving execution efficiency of data processing system 100. This is known as performing "branch lookahead". The depth of lookahead required to avoid stall conditions is a function of the processor pipeline depth and memory access latency, and may vary in different embodiments of the current invention.

In one embodiment of the current invention, which will be further described below, the lookahead depth is equal to two instructions prior to the branch instruction reaching the instruction register 116 for execution. If the branch target can be calculated and an access request made to memory to obtain the target instruction stream at least two instruction cycles prior to the branch reaching the instruction register for execution, no additional stall conditions will be caused for processor 184. This can be accomplished if the branch instruction is detected in slot 1 (S1) of prefetch buffer 102, since two instructions will be preceding it, namely those in slot 0 (S0), and in instruction register 116. In this case, the branch target may be calculated, and a request made to memory to obtain the target instructions, which will arrive back to processor 184 in time to avoid additional execution stall cycles due to the delay incurred in accessing the target instruction stream.

It may be possible that not every branch instruction will be detectable in slot 1 of prefetch buffer 102, since branch instructions may bypass slot 1 and be loaded directly into instruction register 116, or slot 0 of prefetch buffer 102 via data bus 130. These conditions occur when a change of flow occurs, and the target instruction stream contains a branch instruction near the head of the new stream. Since the first two returning instructions will be loaded into instruction register 116 and slot 0 of prefetch buffer 102, they will not have been resident in slot 1 of prefetch buffer 102, and thus there will not have been an opportunity to fetch the target of the second change of flow early enough to avoid stalling processor 184 while waiting for the second target instruction stream to arrive. In addition, if processor 184 completes execution of an instruction while waiting for the third and fourth instruction from a target stream to arrive, the instruction pipeline will advance, and the returning third and fourth instructions will be placed in slot 0 and slot 1 of prefetch buffer 102, rather than in slot 1 and slot 2. If a branch instruction is present as the third instruction of a new target stream, the branch instruction will not have the opportunity to be present in slot 1, and thus insufficient time will be available to fetch the next target stream and avoid processor 184 stalls using branch lookahead alone.

In other embodiments, branch instructions may not hit slot 1 of prefetch buffer 102 for other reasons. For example, a data processing system with a unified memory bus could drain the instruction buffer 105 while executing consecutive load/store instructions. A subsequent fetch to fill the instruction register and slot 0 after execution of the load/store instructions in the instruction buffer 105 could result in a subsequent branch instruction not to be processed in slot 1 of the prefetch buffer 102.

Even though a branch instruction may not arrive in slot 1 early enough to avoid inducing an additional stall condition, there may still be an opportunity to partially accelerate branches by calculating the branch target address and requesting the target instruction stream while the branch instruction is in slot 0 of prefetch buffer 102. In this case, one or more cycles of stall may still be avoided.

Even if a branch instruction can be loaded into slot 1 of instruction buffer 105, there may not be an opportunity to begin fetching the target stream for that particular branch instruction, since it is possible that a different branch instruction is also present in slot 0 or in instruction register 116. In this case, in one embodiment, the earlier branch in instruction register 116 will be given higher priority for memory access, even though the earlier branch may not actually be taken if the branch condition is not met. In this case, the target instruction stream for the first branch will be discarded, but the opportunity for fetching the target stream for a following branch which is resident in slot 1 of prefetch buffer 102 will have been missed.

It can be seen that using the branch lookahead technique can reduce processor 184 stall conditions if an upcoming change of flow instruction can be detected early enough, and a request made to memory to fetch the target stream, but there are frequent cases where it cannot. For these cases, a branch target buffer may be used to accelerate access to the target stream of a branch instruction. In one embodiment of the present invention, BTB 144 holds precalculated target addresses for branch instructions which have been previously stored in the BTB. Since calculation of the target address requires time, in one embodiment, a target address can be requested one or more clock cycles earlier than if the branch lookahead technique is used. If a BTB entry is available which contains the target address, the target instruction stream can be established prior to the branch arriving into prefetch buffer 102 or instruction register 116. The branch instruction's address can be used to perform a lookup in BTB 144 to determine if a matching entry is present. If so, the target address is obtained from BTB 144, and a memory request may be made to obtain the instructions at the branch target location.

BTB 144 contains a limited number of entries for storing the target addresses of branch instructions. For highest performance of data processing system 100, those branches which can be accelerated by branch lookahead in prefetch buffer 102 without causing additional processor 184 stalls, are not allocated an entry in BTB 144, thus increasing the "effective" capacity of BTB 144.

Since multiple branch instructions may be present in instruction register 116 and prefetch buffer 102, decode and control logic 164 must prioritize the selection of the branch target stream to be accessed. In one embodiment of the present invention, the branch instruction in the instruction register is prioritized highest, prefetch buffer 102 slot 0 is prioritized next highest, prefetch buffer 102 slot 1 next, and so forth, since this represents the logical order of instructions in the instruction stream. DCL 164 thus scans the instructions beginning with instruction register 116 and working backwards in order through prefetch buffer 102 slots 0, and then 1. If a branch instruction is found in a higher priority location, those in lower priority locations are temporarily ignored.

When DCL 164 determines that the instruction located in instruction register 116 is not a branch instruction, load BTB 174 remains deasserted. BTB updates are only performed after it is determined that a branch is actually taken, and this is not always determined until the branch instruction reaches the instruction register 116.

In at least one embodiment of the present invention, DCL 164 may also contain branch prediction logic used to predict the outcome of conditional branches. Depending on the prediction as to the taken or not-taken outcome of the conditional branch, the target instruction stream may be prefetched, or, in some embodiments, may be delayed from being prefetched until the branch condition is actually resolved. Alternate embodiments of the present invention may implement prediction logic in BTB 144, or in other locations in processor 184, or may not utilize branch prediction logic. When branch prediction logic is not used, in some embodiments, branch target locations are prefetched without waiting for the branch condition to be resolved, which is equivalent to predicting the branch will be taken for the purpose of prefetching the branch target location.

In one embodiment of the present invention, branch address calculator 108 may be used to determine the slot target addresses of the instructions in prefetch buffer 102 and the instruction register target address of the instruction in instruction register 116. For example, during a clock cycle, branch address calculator 108 receives the displacement fields of the instructions stored in prefetch buffer 102 and instruction register 116 and the address of the instruction currently being executed from program counter PC 112. Branch address calculator 108 then calculates the slot 0 target address (S0TA) of the instruction in slot 0, the slot 1 target address (S1TA) of the instruction in slot 1, and the instruction register target address (IRTA) of the instruction in instruction register 116. Either of IRTA, S0TA, S1TA, etc. may be selected when DCL 164 determines that an instruction stored in instruction buffer 105 is a branch instruction, as will be described further below.

Operation of at least one embodiment of the present invention shown in FIG. 1 will be described below referencing the flow diagrams shown in FIG. 2 and FIG. 3. In one embodiment of the present invention, flow begins at START oval 205 and proceeds to decision diamond 210 to determine if there is a branch instruction in IR 116. If the result of this determination is yes, flow proceeds to decision diamond 215, where it is determined whether the branch instruction was previously prefetched into slot 1 of prefetch buffer 102 before reaching IR 116. If the result of this determination is yes, flow proceeds to decision diamond 267 to determine whether the branch target was requested. If the result of this determination is yes, flow proceeds to step 295, wherein no new BTB 144 entry is allocated, and there is a wait for the target location to arrive. Flow then proceeds to next cycle oval 260, to begin the next cycle. In this case, there is no need to allocate a new BTB 144 entry for the branch in IR 116, since the target was prefetched from slot 1 of prefetch buffer 102, and may arrive at processor 184 in time to avoid any additional stall cycles.

Returning back to decision diamond 267, if the branch target was not previously requested, then flow proceeds to decision diamond 270 to determine whether there was a BTB hit for the branch instruction. If the determination is yes, flow proceeds to step 275, where the results of the BTB lookup along with the results of any branch predictor logic are used to prefetch the target location. Flow then proceeds to next cycle oval 260. If the determination in decision diamond 270 is that there was no BTB hit, flow proceeds to decision diamond 280 to determine if the processor is stalled. The processor may have stalled for any number of reasons, including data dependencies from multicycle instructions. If the determination is yes, flow proceeds to step 290, where the target location is prefetched based on the results of branch prediction logic, and no BTB entry is allocated. In this case, the processor 184 stall may provide enough time to obtain the branch target location without requiring a BTB entry, thus avoiding the need to allocate a new entry. This results in more effective use of BTB 144. Flow then proceeds to next cycle oval 260.

Returning back to decision diamond 280, if there is no processor 184 stall, flow proceeds to step 285, where the target location is prefetched based on the results of branch prediction logic, and a new BTB entry is allocated if the branch is resolved to be taken. In this case, allocation of a BTB entry may allow for improved branch performance the next time this particular branch is encountered. Flow then proceeds to next cycle oval 260.

Returning back to decision diamond 215, if the branch instruction was not prefetched into slot 1 of prefetch buffer 102, flow proceeds to decision diamond 220 where a determination is made whether the branch instruction was prefetched into slot 0 of prefetch buffer 102. If the result of the determination is no, flow proceeds to decision diamond 225 where a determination is made whether a BTB hit has occurred. If a BTB hit has not occurred, flow proceeds to step 230, where the branch target is prefetched based on the results of branch prediction logic, and a new BTB entry is allocated if the branch is resolved to be taken. In this case, allocation of a BTB entry may allow for improved branch performance the next time this particular branch is encountered. Flow then proceeds to next cycle oval 260.

If a BTB hit has occurred as determined by decision diamond 225, flow then proceeds to step 275, and operation continues as described earlier in reference to the operation of step 275.

Returning back to decision diamond 220, if the branch instruction was prefetched into slot 0 of prefetch buffer 102, flow proceeds to decision diamond 222 where a determination is made whether the branch target was requested from slot 0. If the branch target location was requested, flow proceeds to decision diamond 226 to determine whether there is a processor stall condition. If there is a processor stall condition, flow continues to step 295 and operation continues as described earlier in reference to the operation of step 295. If there is not a processor stall condition, flow continues to step 300 and a new BTB entry is conditionally allocated if the branch is resolved to be taken, and the processor waits for the target to arrive. If the branch target location was not requested as determined by decision diamond 222, flow proceeds to decision diamond 224, where a determination is made whether there was a BTB hit. If there was a BTB hit, flow proceeds to step 275, and operation continues as described earlier in reference to the operation of step 275.

If there was no BTB hit as determined by decision diamond 224, flow proceeds to decision diamond 280 to determine whether a processor 184 stall condition is present, and operation continues as described earlier in reference to the operation of step 280.

Returning back to decision diamond 210, if there is not a branch in IR 116, flow proceeds to decision diamond 235 where it is determined whether there is a branch instruction in slot 0 of prefetch buffer 102. If the result of the determination is YES, flow proceeds to decision diamond 265 to determine whether the branch instruction in slot 0 was prefetched into slot 1. If the branch instruction was prefetched into slot 1, flow proceeds to decision diamond 267 and operation continues as described earlier in reference to the operation of decision diamond 267. If the branch instruction was not prefetched into slot 1, flow continues to decision diamond 270, and operation continues as described earlier in reference to the operation of decision diamond 270. If the result of the determination in decision diamond 235 is no, flow proceeds to decision diamond 240 where it is determined whether there is a branch instruction in slot 1 of prefetch buffer 102. If the result of the determination is no, flow proceeds to next cycle oval 260, since no branch instructions have been found in a predetermined subset of locations of instruction buffer 105. If the result of the determination in decision diamond 240 is that there is a branch instruction in slot 1 of prefetch buffer 102, in one embodiment, flow proceeds to decision diamond 245 to determine if a BTB hit has occurred for the branch instruction in slot 1. If a BTB hit has occurred, flow proceeds to step 255, and the results of the BTB lookup and branch predictor logic are used to prefetch the branch target. Flow then proceeds to next cycle oval 260. In one embodiment of the present invention, if the result of decision diamond 245 is that no BTB hit has occurred, flow proceeds to step 250, where the branch target location is prefetched based on the predictor logic, and no new BTB entry is allocated. Instead, the target fetch is allowed to complete, and then flow proceeds to next cycle oval 260.

Figure 3:
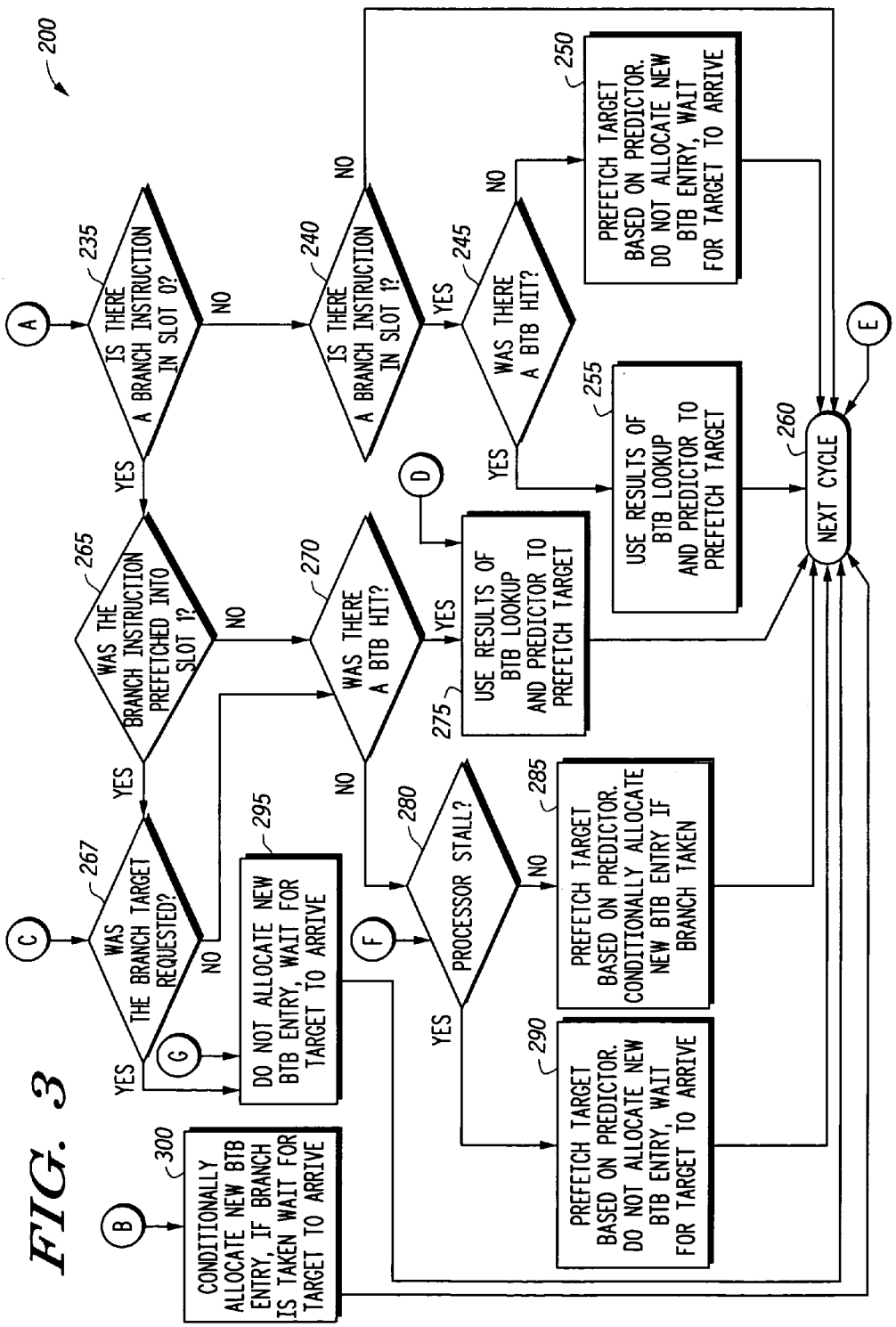
FIG. 3 illustrates, in flow diagram form, one embodiment of the method of the present invention.

In an alternate embodiment, step 245 of the flow in FIG. 3 may be eliminated, and flow may proceed directly to step 250 from a "YES" determination in step 240. This may occur since the branch target address may be calculated in slot 1, and the target instruction stream fetched without assistance of BTB 144, given that enough time is available for the target instructions to arrive.

Figure 2:
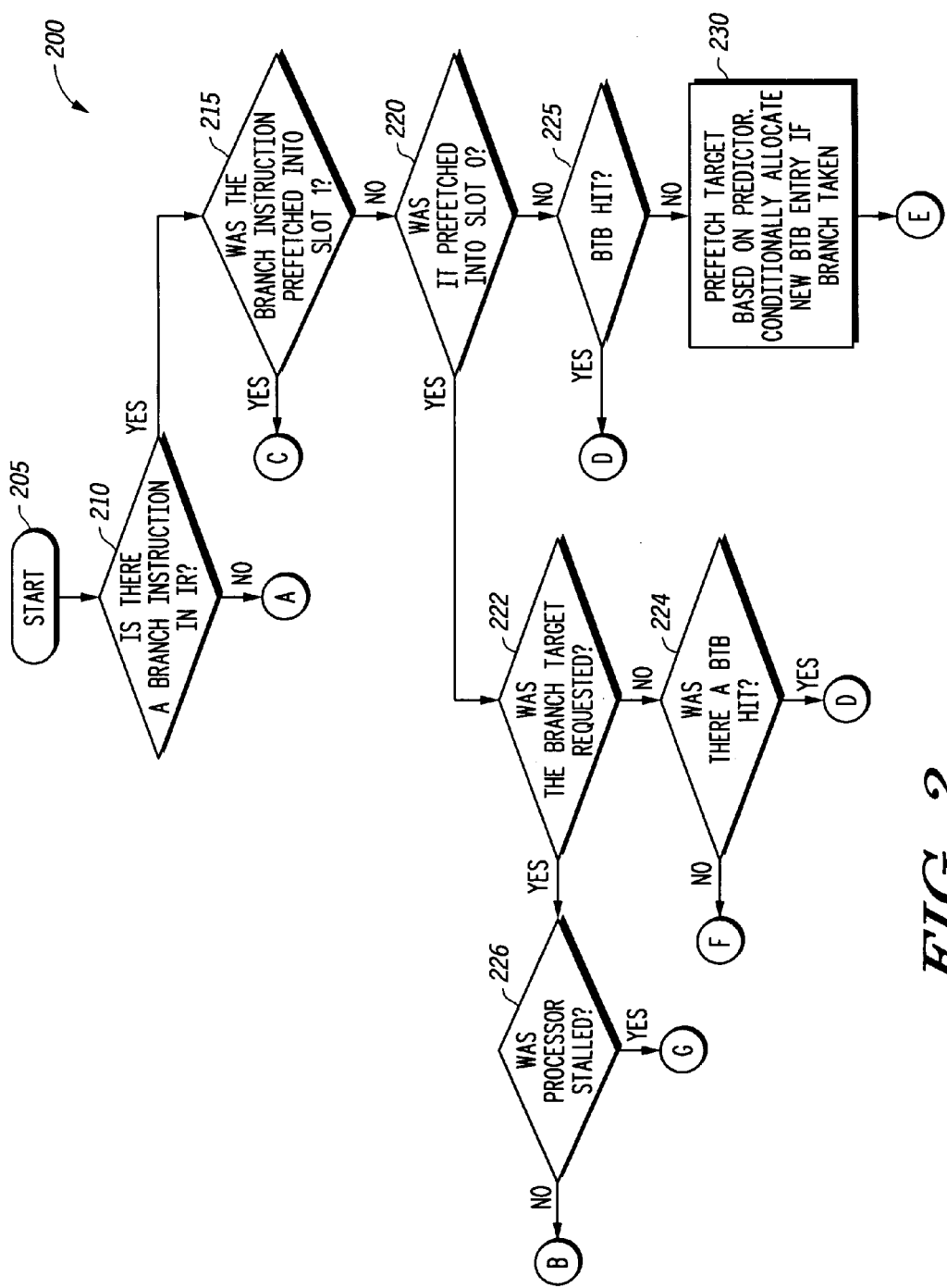
FIG. 2 illustrates, in flow diagram form, one embodiment of the method of the present invention.

The flows illustrated in FIG. 2 and 3 represent at least one possible way in which BTB 144 of processor 184 may be advantageously operated in order to provide maximum utility. By determining the conditions under which branch target locations may be obtained without utilizing BTB 144 and still avoid incurring additional delays in the operation of system 100, more efficient use may be made of the limited capacity of BTB 144.

Operation of at least one embodiment of the present invention shown FIG. 1 will be described below referencing timing diagrams shown in FIG. 4, FIG. 5, FIG. 6, FIG. 7, and the flow diagrams shown in FIG. 2 and FIG. 3. Assume that at the beginning of the first clock cycle of each of the timing diagrams shown in FIG. 4 and FIG. 5, load BTB 174, and comparator match signal 197 are deasserted.

Figure 4:
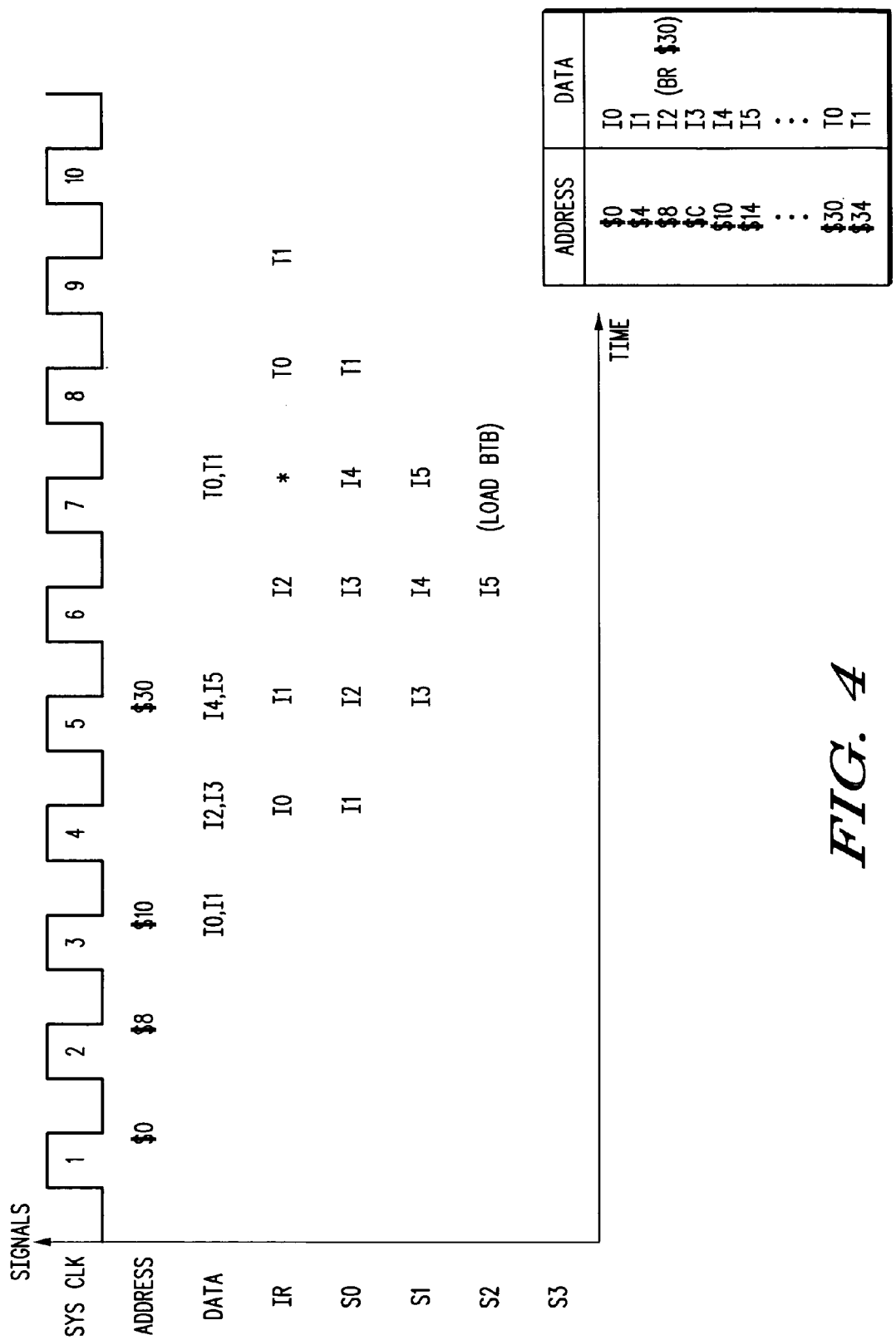
FIG. 4 illustrates, a timing diagram of a data processing system in accordance with one embodiment of the present invention.

In at least one embodiment of the present invention shown in FIG. 1 referencing FIG. 4, during the first clock cycle, DCL 164 determines whether two slots are available in instruction buffer 105. When DCL 164 determines that two slots are available in instruction buffer 105, in this case, instruction register 116 and slot 0, request signal 199 is asserted and the two slots, instruction register 116 and slot 0, are reserved. Request signal 199 is provided to memory 166 from DCL 164 and is used to request the instructions being fetched from memory 166. The instruction address corresponding to the initial instruction being fetched is provided by program counter 112 to MUX 126 via IIA 123. DCL 164 uses MUX 126 to select the initial instruction address 123, which is then driven onto address 128 to request instructions I0 and I1 located at address $0 and address $4 in memory 166.

The instruction address driven onto address bus 128, $0, is provided to latch 160, comparator 170, and memory 166. Latch 160, which is coupled to address bus 128 and adder 156, captures the instruction address driven onto address bus 128. Adder 156 then increments the current instruction address by the doubleword fetch size, $8. As stated previously, the doubleword fetch size may vary in different embodiments of the present invention and is dependent upon the size of each instruction being fetched. The capture by latch 160 and the incrementation caused by adder 156 of the address on address bus 128 occur during every clock cycle where there is an address driven onto address bus 128 and a request is made to memory. The incremented address, in this case, $8, is output by adder 156 as sequential instruction address (SIA) 158.

Comparator 170 receives the address driven onto address bus 128 and compares the address to the branch instruction address or addresses, if any, stored in branch target buffer 144. Branch target buffer 144 includes branch instruction address (BIA) slots for storing the addresses of branch instructions received from memory 166, branch target address (BTA) slots for storing the calculated target addresses corresponding to those branch instructions, and flag bit (FB) slots whose asserted (valid) or deasserted (invalid) bits represent whether each branch instruction address slot and corresponding branch target address slot has a valid or invalid branch instruction address. When a branch instruction address is loaded into a BIA slot in BTB 144 and the corresponding branch target address is loaded into a corresponding BTA slot in BTB 144, the associated flag bit is asserted to indicate a valid BTB entry. At reset, start-up, and when a branch instruction address is not in a BIA slot or the corresponding branch target address is not in a BTA slot in BTB 144, the associated flag bit is deasserted. The flag bit may be, for example, a 0 or 1 to represent whether the BIA and BTA are valid or invalid.

When comparator 170 determines that the address driven onto address bus 128 matches any of the branch instruction addresses stored in BTB 144 and the associated flag bit is valid, a BTB hit has occurred and comparator 170 asserts comparator match signal 197. Comparator 170 also selects the branch target address corresponding to the branch instruction address that has generated a BTB hit using signal 180 and MUX 154. The selected branch target address is provided to MUX 126 using branch target buffer target address (BTBTA) 178. Since comparator match signal 197 is asserted, DCL 164 selects BTBTA 178 and drives the branch target address onto address bus 128.

When comparator 170 determines that the address driven onto address bus 128 does not match any branch instruction address in BTB 144 or the address driven onto bus 128 matches a branch instruction address in BTB 144 but the flag bit corresponding to the matched BIA address is invalid, a BTB miss has occurred and comparator match signal 197 is deasserted by comparator 170. When comparator match signal 197 is deasserted, DCL 164 does not select BTBTA 178 as the address to be driven onto address bus 128. In the example shown in FIG. 4, a BTB miss has occurred during the first clock cycle, hence, comparator match signal 197 is deasserted and BTBTA 178 is not selected by DCL 164.

During the second clock cycle, DCL 164 determines whether two slots in instruction buffer 105 are available for storing two instructions. Since two slots are available in prefetch buffer 102, in this case, slot 1 and slot 2, DCL 164 asserts request signal 199, reserves slots 1 and 2, and selects SIA 158. The sequential instruction address, $8, is driven onto address bus 128 and provided to latch 160, comparator 170, and memory 166. Latch 160 captures the instruction address driven onto address bus 128 and adder 156 increments the captured instruction address by $8, yielding a sequential instruction address of $10. Comparator 170 determines whether a BTB hit or a BTB miss has occurred between the address driven onto address bus 128, $8, and the valid branch instruction addresses, if any, in BTB 144. In this case, since there is not a match between the address driven on address bus 128 and any address stored in the branch instruction address portion of BTB 144, a BTB miss occurs and comparator match signal 197 is deasserted. The instructions, I2 and I3, corresponding to the sequential instruction address $8 driven onto address bus 128, are fetched and provided to prefetch buffer 102 via bus 168 and data bus 130 during the fourth clock cycle.

During the third clock cycle, instructions I0 and I1, corresponding to the instruction address driven onto address bus 128 during the first clock cycle, are driven onto data bus 130 to be loaded into instruction register 116 and slot 0 of prefetch buffer 102 during the fourth clock cycle. DCL 164 determines that two slots, slots 3 and 4, of prefetch buffer 102 are available to store two instructions from memory 166 and asserts request signal 199, reserves slots 3 and 4, and selects SIA 158. The selected sequential instruction address $10 is driven onto address bus 128 and provided to latch 160, comparator 170, and memory 166. Latch 160 captures the instruction address driven onto address bus 128 and adder 156 increments the captured instruction address, yielding a sequential instruction address of $18. Comparator 170 determines whether a BTB hit or a BTB miss has occurred between the address driven onto address bus 128, $10, and the branch instruction addresses, if any, stored in BTB 144. In this case, since all flag bits in the flag bit portion of BTB 144 are invalid, a BTB miss occurs, comparator match signal 197 is deasserted, and comparator 170 does not select the BTBTA 178 corresponding to the BIA.

During the fourth clock cycle, DCL 164 determines whether two slots in prefetch buffer 102 are available to store two instructions from memory 166. Since, in this case, the three previous fetches during the first three clock cycles (at two instructions per fetch) have filled up or reserved six slots in prefetch buffer 102, two slots are not available to store two additional instructions from memory 166. Hence, request signal 199 is deasserted, no additional slots are reserved, and DCL 164 selects SIA 158. Since SIA 158 is selected, sequential instruction address, $18, is driven onto address bus 128 and provided to latch 160, comparator 170, and memory 166. However, since request signal 199 is deasserted, the instructions corresponding to the instruction address $18 driven onto address bus 128, are not requested during the fourth clock cycle, since two slots are not available in prefetch buffer 102. Comparator 170 receives the nonrequested address and compares the nonrequested address to the BIA of BTB 144. DCL 164, however, ignores any comparator match signal 197 sent by comparator 170 when request signal 199 is deasserted.

Instruction I0, requested during the first clock cycle, is loaded into instruction register 116 and instruction I1, also requested during the first clock cycle, is loaded into slot 0 in cycle 4. Instructions I2 and I3, corresponding to the instruction address $8 driven onto address bus 128 during the second clock cycle, are placed on bus 168 and data bus 130 to be loaded into slot 0 and slot 1 of prefetch buffer 102 at the beginning of the fifth clock cycle.

DCL 164 receives opcode 176 of the instruction I0 from instruction register 116 and determines whether the instruction is a branch instruction (210). DCL 164 is cognizant of the opcodes of the branch instructions being used in data processing system 100 and is able to compare the received opcode 176 to the opcodes of processor 184. When DCL 164 determines that the instruction I0 in instruction register 116 is not a branch instruction, DCL 164 uses opcode 190 of the instruction I1 in slot 0 to determine whether the instruction loaded into slot 0 is a branch instruction (235). When DCL 164 determines that the instruction loaded into slot 0 is not a branch instruction, DCL 164 uses opcode 192 of the instruction stored in slot 1 to determine whether there is a branch instruction in slot 1 (240). In this case, slot 1 does not yet contain a valid instruction. When DCL 164 determines that there is not a branch instruction in any predetermined subset of the instructions stored in instruction buffer 105, (i.e., in instruction register 116 and in slots 0 and 1 of prefetch buffer 102) the current cycle ends without branch processing (260) and processor 184 continues to the fifth clock cycle.

During the fifth clock cycle, DCL 164 determines whether two slots in prefetch buffer 102 are available to store two instructions from memory 166. Since two slots are available, in this case, slot 4 and slot 5, request signal 199 is asserted and slots 4 and 5 are reserved. Instructions I4 and I5, corresponding to the instruction address $10 driven onto address bus 128 during the third clock cycle, are placed on bus 168 and data bus 130 to be loaded into slot 1 and slot 2 of prefetch buffer 102 during the sixth clock cycle. Instruction I0, present in instruction register 116 during the fourth clock cycle, is replaced with instruction I1 from slot 0. Instructions I2 and I3, requested during the second cycle, are loaded into slot 0 and slot 1, respectively. As instructions are executed, subsequent instructions are shifted forward (toward the instruction register 116) into the next slot. Instructions fetched from memory may not necessarily be loaded into the slots reserved at the time a request was made to perform the fetch, since instructions in the prefetch buffer may be proceeding forward toward the IR as earlier instructions are executed. Instead, they are loaded into the proper slots corresponding to the progression of instructions which precede them.

The opcodes 176, 190, 192 of instructions I1, I2, and I3 loaded into instruction register 116, slot 0, and slot 1 are provided to DCL 164. DCL 164 receives opcode 176 of the instruction I1 stored in instruction register 116 and determines whether the instruction is a branch instruction (210). When DCL 164 determines that the instruction I1 located in instruction register 116 is not a branch instruction, DCL 164 uses opcode 190 to determine whether the instruction I2 in slot 0 is a branch instruction (235).

When DCL 164 determines that the instruction loaded into slot 0 is a branch instruction, in order to prevent duplicate branch target fetching, DCL 164 determines whether the branch instruction in slot 0 was provided to slot 0 from slot 1 (265). When DCL 164 determines that the branch instruction in slot 0 was provided to the instruction register 116 from slot 1, DCL 164 determines whether the branch target was requested from slot 1 (267). When DCL 164 determines that the target of the branch instruction in slot 0 was requested from slot 1, a new entry in BTB 144 is not allocated for the branch instruction in slot 0 and load BTB 174 is not asserted (295). In this case, the branch instruction is decoded early enough before reaching the instruction register 116 for execution that the branch target can be fetched from memory and arrive back at the processor for execution without causing processor 184 to stall waiting for the target instruction to arrive. In this case, there is no benefit to allocating a BTB entry for this branch, since enough time is available for memory to respond to the target fetch request made from slot 1 before the branch instruction completes execution in the instruction register.

When the branch instruction in slot 0 was not provided from slot 1 (265), as is the case in FIG. 4, DCL 164 determines whether comparator match signal 197 was asserted, indicating a BTB hit, i.e., was there a BTB hit (270). When DCL 164 determines that comparator match signal 197 was asserted, the target address of the branch instruction in slot 0 and the branch instruction address are not placed in branch target buffer 144, since they are already present, and BTBTA 178 is selected by DCL 164 to be driven on address bus 128 (275). In this case, the branch instruction's target was not able to be prefetched from slot 1, since the branch instruction was loaded into slot 0 directly. Not all branch instructions pass through slot 1, since instructions arriving from memory are placed in the next available empty location closest to the instruction register. If the processor has emptied slot 0 and the branch instruction is the first instruction of a pair of instructions arriving from memory, it will be placed into slot 0 on arrival, and the second instruction of the arriving pair will be placed into slot 1. If the processor has emptied both the IR and slot 0 (i.e. no further instructions remain to be executed), then the returning pair of instructions will be placed into the IR and slot 0, and regardless of the location of the branch instruction, it will not be loaded into slot 1.

When DCL 164 determines that comparator match signal 197 is deasserted (BTB miss) which is the case in FIG. 4, DCL 164 determines whether a condition for stall signal in DCL 164 is asserted (280). The condition for stall signal in DCL 164 indicates whether processor 184 has stalled for reasons related to, for example, an execution dependency of an instruction on a prior instruction. When DCL 164 determines that a condition for stall signal in DCL 164 is deasserted, which is the case in FIG. 4, branch address calculator 108 uses the displacement of the branch instruction in slot 0 and the output of program counter 112 to generate slot 0 target address (S0TA) 124, which is used to prefetch the branch instruction's target address. DCL 164 then selects S0TA 124 using MUX 126 to drive to the branch target address, $30, onto address bus 128 (285). The target instructions corresponding to the S0TA 124 are then returned via bus 168 and data bus during the seventh clock cycle. In this case, an entry in the BTB will be allocated for the branch if it is resolved to be taken, so that on a subsequent encounter of the branch instruction, a BTB hit may occur, and the branch target fetch may occur a cycle earlier, without waiting for branch address calculator 108 to generate the S0TA value.

When DCL 164 determines that the condition for stall signal is asserted, the target address of the branch instruction and the branch instruction address are not loaded into branch target buffer 144 during a subsequent clock cycle (290) since loading BTB 144 would not result in any cycle savings in processor 184, due to the existence of another stall condition. This stall condition provides an opportunity for memory 166 to return the branch target instructions to processor 184 without introducing any additional stall cycles, thus no BTB entry needs to be allocated. This condition is not present in FIG. 4. Processor 184 then proceeds to the next cycle.

During the sixth clock cycle, the branch instruction, I2, that was in slot 0 during the fifth clock cycle, is loaded into instruction register 116, instruction I3 is loaded into slot 0 from slot 1, I4 is loaded into slot 1 from data bus 130, and I5 is loaded into slot 2 from data bus 130. DCL 164 uses opcode 176 to determine whether instruction I2 in instruction register 116 is a branch instruction (210). When DCL 164 determines that the instruction in instruction register 116 is a branch instruction, DCL 164 determines whether the branch instruction in instruction register 116 was prefetched into slot 1 (215). When DCL 164 determines that the branch instruction in instruction register 116 was not prefetched into slot 1, but was prefetched into slot 0 (220), DCL 164 determines whether the branch target was requested from slot 0 (222) Since the branch target was requested from slot 0 in cycle 5, DCL 164 determines whether the processor is stalled (226). In the case of FIG. 4, no processor stall condition exists. Once DCL 164 determines the branch instruction is a taken branch instruction, the branch instruction address and branch target address of the branch instruction in instruction register 116 are loaded into an available slot in BTB 144 via lines PC 110 and IRTA 120, respectively, and the flag bit in BTB 144 associated with the loaded entry is asserted (300). Control circuitry 172 uses lines 173 to determine which slot in BTB 144 is used to store the branch instruction address and the branch target address. BTB 144 now contains the branch instruction address corresponding to I2 and the branch target address corresponding to T0.

During the seventh cycle, instructions T0 and T1, corresponding to the branch target address, $30, requested during the fifth clock cycle, are returned on data bus 130. Since during the sixth clock cycle, instruction I2 was decoded as a taken branch instruction, any instructions loaded into instruction register 116, slot 0, slot 1, etc. after the branch instruction has been decoded but before the branch target instructions are loaded into instruction buffer 105 are considered insignificant and are not decoded by DCL 164 during the seventh cycle, resulting in a stall condition in processor 184 and I3, I4, and I5 being flushed out.

During the eighth clock cycle, instructions T0 and T1, corresponding to the branch target address in memory 166, are loaded into instruction register 116 and slot 0 of prefetch buffer 102, respectively. Similarly, during the ninth clock cycle, instruction T1 from slot 0 is loaded into IR 116, etc. and DCL 164 performs the operations described above for the previous clock cycles.

Figure 5:
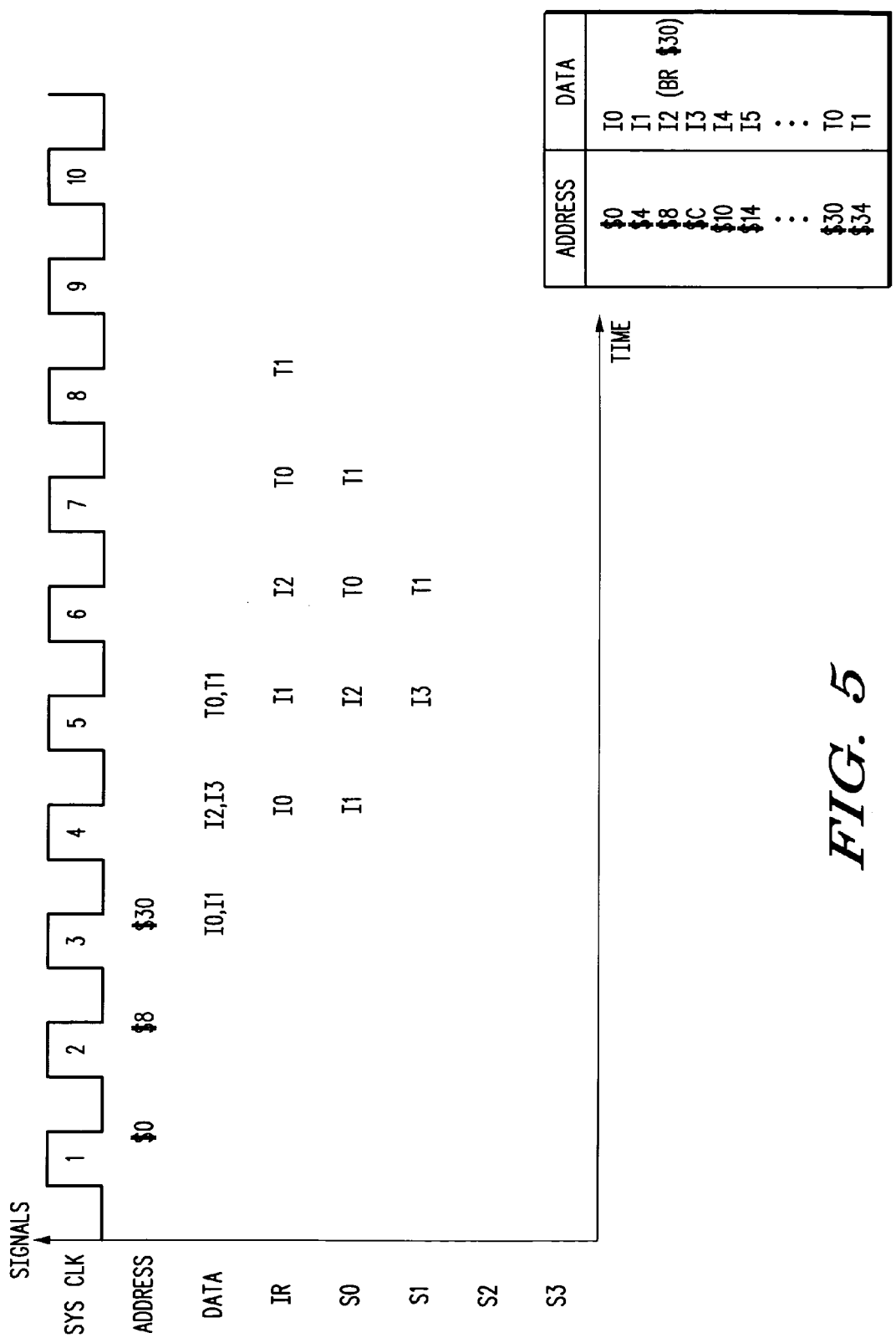
FIG. 5 illustrates, a timing diagram of a data processing system in accordance with one embodiment of the present invention.

In one embodiment of the present invention shown in FIG. 1 with reference to FIG. 5, additional instructions have been loaded in memory 166. BTB 144 has the branch instruction address $8 loaded in a BIA slot, the branch target address $30 loaded in a corresponding BTA slot, and the associated flag bit is asserted as was shown in the example of FIG. 4. During the first clock cycle (See FIG. 5), DCL 164 determines whether two slots are available in instruction buffer 105. When DCL 164 determines that two slots are available in instruction buffer 105, in this case, instruction register 116 and slot 0, request signal 199 is asserted and instruction register 116 and slot 0 are reserved. The instruction address corresponding to the initial instruction being fetched during the current clock cycle set is provided by program counter 112 to MUX 126 via IIA 123. DCL 164 uses MUX 126 to select the initial instruction address, which is then driven onto address 128 to request instructions I0 and I1 located at address $0 and address $4 in memory 166.

The instruction address driven onto address bus 128, $0, is provided to latch 160, comparator 170, and memory 166. Latch 160 captures the instruction address driven onto address bus 128, and adder 156 increments the captured instruction address by $8. The incremented address, $8, is output by adder 156 as sequential instruction address 158.

Comparator 170 receives the address driven onto address bus 128 and compares the address to the branch instruction address stored in branch target buffer 144. For the example shown in FIG. 5, comparator 170 determines that the address driven onto address bus 128 in cycle 1 does not match a branch instruction address in BTB 144, and deasserts comparator match signal 197. Since comparator match signal 197 is deasserted, DCL 164 does not select BTBTA 178 as the address to be driven onto address bus 128.

During the second clock cycle, DCL 164 determines whether two slots in instruction buffer 105 are available for storing two instructions. Since two slots are available in prefetch buffer 102, in this case, slot 1 and slot 2, DCL 164 asserts request signal 199, reserves slots 1 and 2, and selects SIA 158. The sequential instruction address, $8, is driven onto address bus 128 and provided to latch 160, comparator 170, and memory 166. Latch 160 captures the instruction address driven onto address bus 128, and adder 156 increments the captured instruction address by $8, yielding a sequential instruction address of $10.

Comparator 170 compares the address driven onto address bus 128, $8, and the branch instruction address, $8, that is in a BIA slot in BTB 144 and determines that a BTB hit has occurred. In response to the BTB hit, comparator 170 asserts comparator match signal 197. Comparator 170 then selects the branch target address, in this case, $30, corresponding to the branch instruction address that has generated a BTB hit using signal 180 and MUX 154. The selected branch target address is provided to MUX 126 using branch target buffer target address (BTBTA) 178.

During the third clock cycle, instructions I0 and I1, corresponding to the instruction address driven onto address bus 128 during the first clock cycle, are driven onto data bus 130 to be loaded into instruction register 116 and slot 0 of prefetch buffer 102 during the fourth clock cycle. DCL 164 determines that two slots, slots 3 and 4, of prefetch buffer 102 are available to store two instructions from memory 166 and asserts request signal 199 and reserves slots 3 and 4. Since comparator match signal 197 was asserted, DCL 164 selects BTBTA 178 and drives the branch target address, $30, onto address bus 128.

The selected branch target buffer target address $30 that is driven onto address bus 128 is provided to latch 160, comparator 170, and memory 166. Latch 160 captures the instruction address driven onto address bus 128, and adder 156 increments the delayed instruction address by $8, yielding a sequential instruction address of $38. Comparator 170 compares the address driven onto address bus 128, $30, and the branch instruction addresses stored in BTB 144 and determines that a BTB miss has occurred. In response to the BTB miss, comparator 170 deasserts comparator match signal 197 and does not select the BTBTA 178.

During the fourth clock cycle, DCL 164 determines whether two slots in prefetch buffer 102 are available to store two instructions from memory 166. Since, in this case, only one slot is available in prefetch buffer 102, request signal 199 is deasserted, no additional slots are reserved, and DCL 164 selects SIA 158. However, since additional instructions after address $34 in memory 166 are not shown in the example of FIG. 5, the operations performed on the addresses driven onto address bus 128 and the corresponding instructions after clock cycle 4 will not be discussed further in detail.

During the fifth clock cycle, instructions T0 and T1, corresponding to the branch instruction address driven onto address bus 128 during the third clock cycle, $30, are driven onto data bus 130 to be loaded into slot 0 and slot 1 of prefetch buffer 102 during the sixth clock cycle. Instruction I1, that was in slot 0 during the fourth clock cycle, is loaded into IR 116. Instructions I2 and I3, that were on data bus 130 during the fourth clock cycle, are loaded into slot 0 and slot 1, respectively. During the sixth clock cycle, the branch instruction I2 is loaded into IR 116 for execution. During the seventh clock cycle, the new target stream has been established, and begins execution of T0 without a processor 184 stall. DCL 164 then performs the operations of FIG. 4 and FIG. 5 described above in the previous clock cycles.

In one embodiment of the present invention, the sequence of code and timing diagram shown in FIG. 4 can be viewed as the first iteration of a loop containing the segment of code listed in FIG. 4. FIG. 5 can be viewed as all subsequent iterations of the same loop shown in FIG. 4, where the BTB entry for branch instruction address $8 and branch target address $30 were loaded during the first iteration of the loop as shown in FIG. 4. By detecting in FIG. 4 via DCL 164 that using the lookahead branch scheme would still cost a cycle, thereby selectively allocating a BTB entry, the stall cycle can be recovered in all subsequent iterations of the loop.

Figure 6:
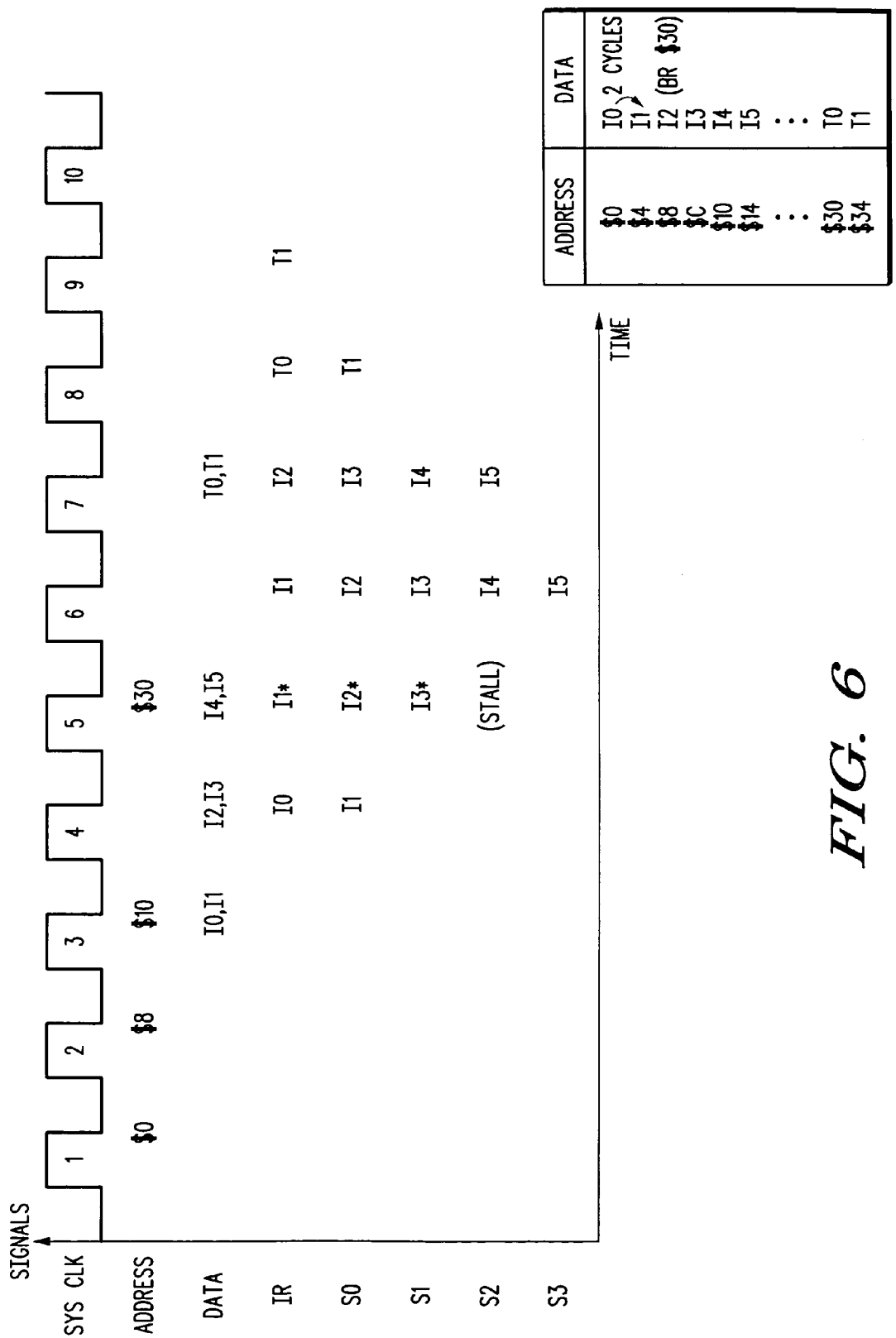
FIG. 6 illustrates a timing diagram of a data processing system in accordance with one embodiment of the present invention.

In one embodiment of the present invention shown in FIG. 1 referencing FIG. 6, during the first clock cycle, DCL 164 determines whether two slots are available in instruction buffer 105. When DCL 164 determines that two slots are available in instruction buffer 105, in this case, instruction register 116 and slot 0, request signal 199 is asserted and the two slots, instruction register 116 and slot 0, are reserved. Request signal 199 is provided to memory 166 from DCL 164 and is used to request the instructions being fetched from memory 166. The instruction address corresponding to the initial instruction being fetched is provided by program counter 112 to MUX 126 via IIA 123. DCL 164 uses MUX 126 to select the initial instruction address 123, which is then driven onto address 128 to request instructions I0 and I1 located at address $0 and address $4 in memory 166.

The instruction address driven onto address bus 128, $0, is provided to latch 160, comparator 170, and memory 166. Latch 160, which is coupled to address bus 128 and adder 156, captures the instruction address driven onto address bus 128. Adder 156 then increments the current instruction address by the doubleword fetch size, $8. As stated previously, the doubleword fetch size may vary in different embodiments of the present invention and is dependent upon the size of each instruction being fetched.

Comparator 170 receives the address driven onto address bus 128 and compares the address to the branch instruction address or addresses, if any, stored in branch target buffer 144. In the example shown in FIG. 6, a BTB miss has occurred during the first clock cycle, hence, comparator match signal 197 is deasserted and BTBTA 178 is not selected by DCL 164.

During the second clock cycle, DCL 164 determines whether two slots in instruction buffer 105 are available for storing two instructions. Since two slots are available in prefetch buffer 102, in this case, slot 1 and slot 2, DCL 164 asserts request signal 199, reserves slots 1 and 2, and selects SIA 158. The sequential instruction address, $8, is driven onto address bus 128 and provided to latch 160, comparator 170, and memory 166. Latch 160 captures the instruction address driven onto address bus 128 and adder 156 increments the captured instruction address by $8, yielding a sequential instruction address of $10 . Comparator 170 determines whether a BTB hit or a BTB miss has occurred between the address driven onto address bus 128, $8, and the valid branch instruction addresses, if any, in BTB 144. In this case, since there is not a match between the address driven on address bus 128 and any address stored in the branch instruction address portion of BTB 144, a BTB miss occurs and comparator match signal 197 is deasserted. The instructions, I2 and I3, corresponding to the sequential instruction address $8 driven onto address bus 128, are fetched and provided to prefetch buffer 102 via bus 168 and data bus 130 during the fourth clock cycle.

During the third clock cycle, instructions I0 and I1, corresponding to the instruction address driven onto address bus 128 during the first clock cycle, are driven onto data bus 130 to be loaded into instruction register 116 and slot 0 of prefetch buffer 102 during the fourth clock cycle. DCL 164 determines that two slots, slots 3 and 4, of prefetch buffer 102 are available to store two instructions from memory 166 and asserts request signal 199, reserves slots 3 and 4, and selects SIA 158. The selected sequential instruction address $10 is driven onto address bus 128 and provided to latch 160, comparator 170, and memory 166. Latch 160 captures the instruction address driven onto address bus 128 and adder 156 increments the captured instruction address, yielding a sequential instruction address of $18. Comparator 170 determines whether a BTB hit or a BTB miss has occurred between the address driven onto address bus 128, $10, and the branch instruction addresses, if any, stored in BTB 144. In the example of FIG. 6, a BTB miss occurs, comparator match signal 197 is deasserted, and comparator 170 does not select the BTBTA 178 corresponding to the BIA.

During the fourth clock cycle, DCL 164 determines whether two slots in prefetch buffer 102 are available to store two instructions from memory 166. Since, in this case, the three previous fetches during the first three clock cycles (at two instructions per fetch) have filled up or reserved six slots in prefetch buffer 102, two slots are not available to store two additional instructions from memory 166. Hence, request signal 199 is deasserted, no additional slots are reserved, and DCL 164 selects SIA 158. Since SIA 158 is selected, sequential instruction address, $18, is driven onto address bus 128 and provided to latch 160, comparator 170, and memory 166. However, since request signal 199 is deasserted, the instructions corresponding to the instruction address $18 driven onto address bus 128, are not requested during the fourth clock cycle, since two slots are not available in prefetch buffer 102. Comparator 170 receives the nonrequested address and compares the nonrequested address to the BIA of BTB 144. DCL 164, however, ignores any comparator match signal 197 sent by comparator 170 when request signal 199 is deasserted.

Instruction I0, requested during the first clock cycle, is loaded into instruction register 116 and instruction I1, also requested during the first clock cycle, is loaded into slot 0 in cycle 4. Instructions I2 and I3, corresponding to the instruction address $8 driven onto address bus 128 during the second clock cycle, are placed on bus 168 and data bus 130 to be loaded into slot 0 and slot 1 of prefetch buffer 102 at the beginning of the fifth clock cycle.

DCL 164 receives opcode 176 of the instruction I0 from instruction register 116 and determines whether the instruction is a branch instruction (210). DCL 164 is cognizant of the opcodes of the branch instructions being used in data processing system 100 and is able to compare the received opcode 176 to the opcodes of processor 184. When DCL 164 determines that the instruction I0 in instruction register 116 is not a branch instruction, DCL 164 uses opcode 190 of the instruction I1 in slot 0 to determine whether the instruction loaded into slot 0 is a branch instruction (235). When DCL 164 determines that the instruction loaded into slot 0 is not a branch instruction, DCL 164 uses opcode 192 of the instruction stored in slot 1 to determine whether there is a branch instruction in slot 1 (240). In this case, slot 1 does not yet contain a valid instruction. When DCL 164 determines that there is not a branch instruction in any predetermined subset of the instructions stored in instruction buffer 105, (i.e., in instruction register 116 and in slots 0 and 1 of prefetch buffer 102) the current cycle ends without branch processing (260) and processor 184 continues to the fifth clock cycle.

In the example shown in FIG. 6, instruction I0 is a multi-cycle instruction requiring two clock cycles of execution, and instruction I1 has a data dependency on the results of instruction I0. Due to the data dependency, a processor 184 stall occurs to allow for completion of instruction I0 before execution of instruction I1. Instruction I1 is thus held in instruction register 116 for an additional cycle beyond cycle 5.

At the beginning of the fifth clock cycle, instructions I2 and I3, corresponding to the instruction address $8 driven onto address bus 128 during the second clock cycle, are captured from bus 168 and data bus 130 and loaded into slot 1 and slot 2 of prefetch buffer 102. Instructions I4 and I5, corresponding to the instruction address $10 driven onto address bus 128 during the third clock cycle, are placed on bus 168 and data bus 130 to be loaded into slot 2 and slot 3 of prefetch buffer 102 during the sixth clock cycle. Instruction I0, present in instruction register 116 during the fourth clock cycle, is replaced with instruction I1 from slot 0. Instructions I2 and I3, requested during the second cycle, are loaded into slot 0 and slot 1, respectively. Instruction I0 requires an additional cycle of execution in this case, and due to the data dependency between instructions I0 and I1, cycle 5 is a stall cycle for instruction decode, as denoted by the asterisk beside I1 in FIG.6.

The opcodes 176, 190, 192 of instructions I1, I2, and I3 loaded into instruction register 116, slot 0, and slot 1 are provided to DCL 164. DCL 164 receives opcode 176 of the instruction I1 stored in instruction register 116 and determines whether the instruction is a branch instruction (210). When DCL 164 determines that the instruction I1 located in instruction register 116 is not a branch instruction, DCL 164 uses opcode 190 to determine whether the instruction I2 in slot 0 is a branch instruction (235).

When DCL 164 determines that the instruction loaded into slot 0 is a branch instruction, in order to prevent duplicate branch target fetching, DCL 164 determines whether the branch instruction in slot 0 was provided to slot 0 from slot 1 (265). When DCL 164 determines that the branch instruction in slot 0 was not provided to the instruction register 116 from slot 1, DCL 164 determines whether there was a BTB 144 hit for I2 (270).

When DCL 164 determines that comparator match signal 197 is deasserted (BTB miss) which is the case in FIG. 6, DCL 164 determines whether a condition for stall signal in DCL 164 is asserted (280). The condition for stall signal in DCL 164 indicates whether processor 184 has stalled for reasons related to, for example, an execution dependency of an instruction on a prior instruction. In this case, there is a processor 184 stall due to the data dependency between multi-cycle instruction I0 and instruction I1. When DCL 164 determines that a condition for stall signal in DCL 164 is asserted, which is the case in FIG. 6, branch address calculator 108 uses the displacement of the branch instruction in slot 0 and the output of program counter 112 to generate slot 0 target address (S0TA) 124, which is then used to prefetch the branch instruction's target address. DCL 164 then selects S0TA 124 using MUX 126 to drive to the branch target address, $30, onto address bus 128. The target instructions corresponding to the S0TA 124 are then returned via bus 168 and data bus during the seventh clock cycle. When DCL 164 determines that the condition for stall signal is asserted, the target address of the branch instruction and the branch instruction address are not loaded into branch target buffer 144 during a subsequent clock cycle (290) since loading BTB 144 would not result in any cycle savings in processor 184, due to the existence of another stall condition.

In this case, the branch instruction is decoded early enough before reaching the instruction register 116 for execution that the branch target can be fetched from memory and arrive back at the processor for execution without causing an additional processor 184 stall waiting for the target instruction to arrive. Due to the existing stall condition in processor 184, a branch target fetch may be made from slot 0 using S0TA, without incurring an additional stall cycle. In this case, there is no benefit to allocating a BTB entry for this branch, since enough time is available for memory to respond to the target fetch request made from slot 0 before the branch instruction completes execution in the instruction register. This stall condition provides an opportunity for memory 166 to return the branch target instructions to processor 184 without introducing any additional stall cycles, thus no BTB entry needs to be allocated. Processor 184 then proceeds to the next cycle.

During the sixth clock cycle, the branch instruction, I2, that was in slot 0 during the fifth clock cycle, remains in slot 0, instruction I3 remains in slot 1, I4 is loaded into slot 2 from data bus 130, and I5 is loaded into slot 3 from data bus 130.

During the seventh clock cycle, the branch instruction, I2, that was in slot 0 during the fifth and sixth clock cycles, is loaded into instruction register 116, instruction I3 is loaded into slot 0 from slot 1, I4 is loaded into slot 1 from slot 2, and I5 is loaded into slot 3 from slot 4. Target instructions T0 and T1 are returned from memory 166 and placed on data bus 130 to be loaded into instruction buffer 105 in clock eight. DCL 164 uses opcode 176 to determine whether instruction I2 in instruction register 116 is a branch instruction (210). When DCL 164 determines that the instruction in instruction register 116 is a branch instruction, DCL 164 determines whether the branch instruction in instruction register 116 was prefetched into slot 1 (215). When DCL 164 determines that the branch instruction in instruction register 116 was not prefetched into slot 1, but was prefetched into slot 0 (220), DCL 164 determines whether the branch target was requested from slot 0 (222) Since the branch target was requested from slot 0 in cycle 5, DCL 164 determines if processor 184 was stalled for another condition, such as a data dependency (226). In the case of FIG.6, a processor stall condition did exist. Once DCL 164 determines this, no BTB 144 update is performed, and processor 184 waits for the target instructions to arrive (300).

During the seventh cycle, instructions T0 and T1, corresponding to the branch target address, $30, requested during the fifth clock cycle are returned on data bus 130. Since during the seventh clock cycle, instruction I2 is decoded as a taken branch instruction, any sequential instructions loaded into instruction buffer 105 following the branch instruction are considered insignificant and are not decoded by DCL 164 during the seventh cycle, resulting in I3, I4, and I5 being flushed out in the eighth cycle.

During the eighth clock cycle, instructions T0 and T1, corresponding to the branch target address in memory 166, are loaded into instruction register 116 and slot 0 of prefetch buffer 102, respectively. Similarly, during the ninth clock cycle, instruction T1 from slot 0 is loaded into IR 116, etc. and DCL 164 performs the operations described above for the previous clock cycles.

Figure 7:
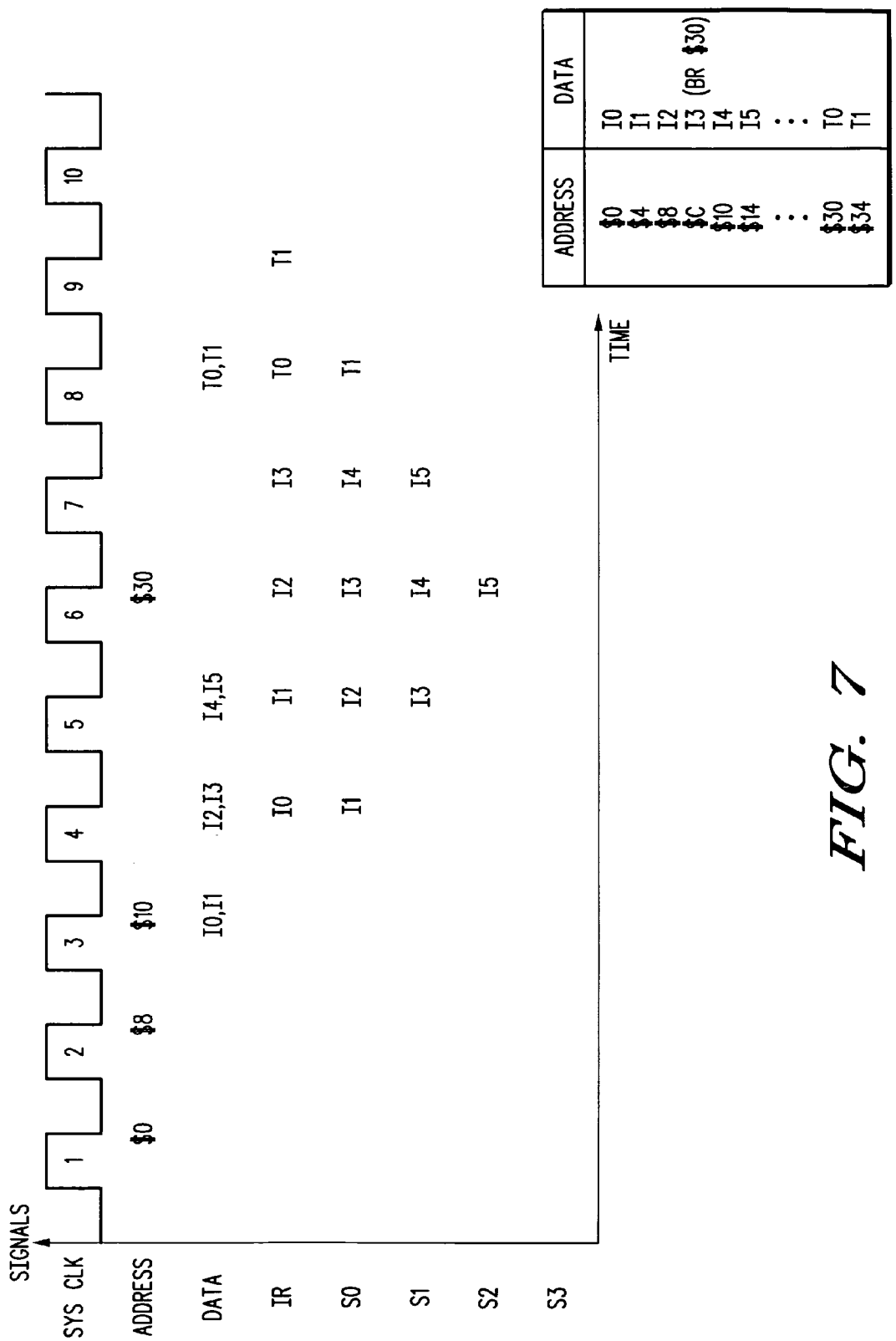
FIG. 7 illustrates a timing diagram of a data processing system, in accordance with one embodiment of the present invention.

In one embodiment of the present invention shown in FIG. 1 referencing FIG. 7, during the first clock cycle, DCL 164 determines whether two slots are available in instruction buffer 105. When DCL 164 determines that two slots are available in instruction buffer 105, in this case, instruction register 116 and slot 0, request signal 199 is asserted and the two slots, instruction register 116 and slot 0, are reserved. Request signal 199 is provided to memory 166 from DCL 164 and is used to request the instructions being fetched from memory 166. The instruction address corresponding to the initial instruction being fetched is provided by program counter 112 to MUX 126 via IIA 123. DCL 164 uses MUX 126 to select the initial instruction address 123, which is then driven onto address 128 to request instructions I0 and I1 located at address $0 and address $4 in memory 166.

The instruction address driven onto address bus 128, $0, is provided to latch 160, comparator 170, and memory 166. Latch 160, which is coupled to address bus 128 and adder 156, captures the instruction address driven onto address bus 128. Adder 156 then increments the current instruction address by the doubleword fetch size, $8. As stated previously, the doubleword fetch size may vary in different embodiments of the present invention and is dependent upon the size of each instruction being fetched. The capture by latch 160 and the incrementation caused by adder 156 of the address on address bus 128 occur during every clock cycle where there is an address driven onto address bus 128 and a request is made to memory. The incremented address, in this case, $8, is output by adder 156 as sequential instruction address SIA 158.

Comparator 170 receives the address driven onto address bus 128 and compares the address to the branch instruction address or addresses, if any, stored in branch target buffer 144.

When comparator 170 determines that the address driven onto address bus 128 does not match any branch instruction address in BTB 144 or the address driven onto bus 128 matches a branch instruction address in BTB 144 but the flag bit corresponding to the matched BIA address is invalid, a BTB miss has occurred and comparator match signal 197 is deasserted by comparator 170. When comparator match signal 197 is deasserted, DCL 164 does not select BTBTA 178 as the address to be driven onto address bus 128. In the example shown in FIG. 7 a BTB miss has occurred during the first clock cycle, hence, comparator match signal 197 is deasserted and BTBTA 178 is not selected by DCL 164.

During the second clock cycle, DCL 164 determines whether two slots in instruction buffer 105 are available for storing two instructions. Since two slots are available in prefetch buffer 102, in this case, slot 1 and slot 2, DCL 164 asserts request signal 199, reserves slots 1 and 2, and selects SIA 158. The sequential instruction address, $8, is driven onto address bus 128 and provided to latch 160, comparator 170, and memory 166. Latch 160 captures the instruction address driven onto address bus 128 and adder 156 increments the captured instruction address by $8, yielding a sequential instruction address of $10. Comparator 170 determines whether a BTB hit or a BTB miss has occurred between the address driven onto address bus 128, $8, and the valid branch instruction addresses, if any, in BTB 144. In this case, since there is not a match between the address driven on address bus 128 and any address stored in the branch instruction address portion of BTB 144, a BTB miss occurs and comparator match signal 197 is deasserted. The instructions, I2 and I3, corresponding to the sequential instruction address $8 driven onto address bus 128, are fetched and provided to prefetch buffer 102 via bus 168 and data bus 130 during the fourth clock cycle.

During the third clock cycle, instructions I0 and I1, corresponding to the instruction address driven onto address bus 128 during the first clock cycle, are driven onto data bus 130 to be loaded into instruction register 116 and slot 0 of prefetch buffer 102 during the fourth clock cycle. DCL 164 determines that two slots, slots 3 and 4, of prefetch buffer 102 are available to store two instructions from memory 166 and asserts request signal 199, reserves slots 3 and 4, and selects SIA 158. The selected sequential instruction address $10 is driven onto address bus 128 and provided to latch 160, comparator 170, and memory 166. Latch 160 captures the instruction address driven onto address bus 128 and adder 156 increments the captured instruction address, yielding a sequential instruction address of $18. Comparator 170 determines whether a BTB hit or a BTB miss has occurred between the address driven onto address bus 128, $10, and the branch instruction addresses, if any, stored in BTB 144. In the case shown in FIG.7, a BTB miss occurs, comparator match signal 197 is deasserted, and comparator 170 does not select the BTBTA 178 corresponding to the BIA.

During the fourth clock cycle, DCL 164 determines whether two slots in prefetch buffer 102 are available to store two instructions from memory 166. Since, in this case, the three previous fetches during the first three clock cycles (at two instructions per fetch) have filled up or reserved six slots in prefetch buffer 102, two slots are not available to store two additional instructions from memory 166. Hence, request signal 199 is deasserted, and no additional slots are reserved. DCL 164 ignores any comparator match signal 197 sent by comparator 170 when request signal 199 is deasserted.

Instruction I0, requested during the first clock cycle, is loaded into instruction register 116 and instruction I1, also requested during the first clock cycle, is loaded into slot 0 in cycle 4. Instructions I2 and I3, corresponding to the instruction address $8 driven onto address bus 128 during the second clock cycle, are placed on bus 168 and data bus 130 to be loaded into slot 0 and slot 1 of prefetch buffer 102 at the beginning of the fifth clock cycle.

In the fifth clock cycle, DCL 164 receives opcode 176 of the instruction I1 from instruction register 116 and determines whether the instruction is a branch instruction (210). When DCL 164 determines that the instruction I1 in instruction register 116 is not a branch instruction, DCL 164 uses opcode 190 of the instruction in slot 0, I2, to determine whether the instruction loaded into slot 0 is a branch instruction (235). When DCL 164 determines that the instruction loaded into slot 0 is not a branch instruction, DCL 164 uses opcode 192 of the instruction stored in slot 1 to determine whether there is a branch instruction in slot 1 (240). In this case, slot 1 does contain a branch instruction, I3. When DCL 164 determines that there is a branch instruction in slot 1 of prefetch buffer 102, a new entry in BTB 144 is not allocated for the branch instruction in slot 1 (250). In this case, the branch instruction is decoded early enough before reaching the instruction register 116 for execution that the branch target can be fetched from memory and arrive back at the processor for execution without causing processor 184 to stall waiting for the target instruction to arrive. In this case, there is no benefit to allocating a BTB entry for this branch, since enough time is available for memory to respond to the target fetch request made from slot 1 before the branch instruction completes execution in the instruction register.

Branch address calculator 108 uses the displacement of the branch instruction in slot 1 and the output of program counter 112 to generate slot 1 target address (S1TA) 122, which is used to prefetch the branch instruction's target address. DCL 164 selects S1TA 122 using MUX 126 to drive to the branch target address, $30, onto address bus 128 in clock cycle 6. The target instructions corresponding to the S1TA 124 are then returned via bus 168 and data bus during the eighth clock cycle.

During the sixth clock cycle, the instruction I2, that was in slot 0 during the fifth clock cycle, is loaded into instruction register 116, branch instruction I3 is loaded into slot 0 from slot 1, I4 is loaded into slot 1 from data bus 130, and I5 is loaded into slot 2 from data bus 130.

During the seventh clock cycle, branch instruction I3 moves up into IR 116, and subsequent instructions move up in prefetch buffer 102.

DCL 164 uses opcode 176 to determine whether instruction I3 in instruction register 116 is a branch instruction (210). When DCL 164 determines that the instruction in instruction register 116 is a branch instruction, DCL 164 determines whether the branch instruction in instruction register 116 was prefetched into slot 1 (215). When DCL 164 determines that the branch instruction in instruction register 116 was prefetched into slot 1, DCL 164 determines whether the branch target was requested from slot 1 (267). Since the branch target was requested from slot 1 in cycle 6, DCL 164 decides that no BTB entry is to be loaded, and waits for the target instructions to arrive (295).

Since during the seventh clock cycle, instruction I3 was decoded as a taken branch instruction, any instructions loaded into instruction register 116, slot 0, slot 1, etc. after the branch instruction has been decoded but before the branch target instructions are loaded into instruction buffer 105 are considered insignificant and are flushed out. During the eighth cycle, the branch target instructions, T0 and T1, corresponding to the branch target address, $30, requested during the sixth clock cycle are returned on data bus 130, and are loaded into instruction register 116 and slot 0 of prefetch buffer 102, respectively via data bus 130. Similarly, during the ninth clock cycle, instruction T1 from slot 0 is loaded into IR 116, etc. and DCL 164 performs the operations described above for the previous clock cycles.

Although the invention has been described with respect to specific conductivity types or polarity of potentials, skilled artisans appreciated that conductivity types and polarities of potentials may be reversed.

In the foregoing specification, the invention has been described with reference to specific embodiments. However, one of ordinary skill in the art appreciates that various modifications and changes can be made without departing from the scope of the present invention as set forth in the claims below. For example, memory 166 may include one or more of computer hard disks, floppy disks, 3.5" disks, computer storage tapes, magnetic drums, static random access memory (SRAM) cells, dynamic random access memory (DRAM) cells, electrically erasable (EEPROM, EPROM, flash) cells, nonvolatile cells, ferroelectric or ferromagnetic memory, compact disks (CDs), laser disks, optical disks, and any like computer readable media. Also, the block diagrams may include different blocks than those illustrated and may have more or less blocks or be arranged differently. Also, the flow diagrams may also be arranged differently, include more or less steps, or may have steps that can be separated into multiple steps or steps that can be performed simultaneously with one another. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method for allocating entries in a branch target buffer (BTB) in a pipelined data processing system, comprising:
   fetching instructions from a plurality of instructions;
   determining that one of the plurality of instructions is a branch instruction;
   decoding the branch instruction to determine a branch target address;
   determining that the branch instruction was not loaded into a predetermined slot of a prefetch buffer and no other stall condition will occur;
   selectively allocating a BTB entry based on the determination; and
   loading a branch target address corresponding to the branch instruction into a predetermined entry of the BTB.

2. The method of claim 1 wherein determining if the branch target address location can be obtained further comprises examining a predetermined slot of a prefetch buffer having a plurality of slots to identify the branch instruction.

3. The method of claim 2 further comprising loading a branch target address corresponding to the branch instruction into a predetermined entry of the BTB.

4. The method of claim 2 wherein the predetermined slot of the prefetch buffer is characterized as being a first slot.

5. The method of claim 1 further comprising:
   determining that a stall condition exists in the data processing system;
   determining that a BTB entry will not be allocated because of the stall condition; and
   waiting for the branch instruction to be fetched from a memory location.

6. The method of claim 1 further comprising using a first-in, first-out replacement algorithm to load the BTB.

7. A method for allocating entries in a branch target buffer (BTB) in a pipelined data processing system, comprising:
   fetching instructions from a plurality of instructions;
   determining that one of the plurality of instructions is a branch instruction;
   decoding the branch instruction to determine a branch target address;
   determining that the branch instruction was not loaded into a predetermined slot of a prefetch buffer and no other stall condition will occur; and
   selectively allocating a BTB entry based on the determination.

8. The method of claim 7 further comprising loading a branch target address corresponding to the branch instruction into a predetermined entry of the BTB.

9. The method of claim 7 wherein the predetermined slot of the prefetch buffer is characterized as being a first slot.

10. The method of claim 7 wherein determining further comprises:
    examining a predetermined slot of a prefetch buffer having a plurality of slots to identify the branch instruction; and
    calculating the branch target address using a program counter value and a displacement field value of the branch instruction.

11. The method of claim 10 further comprising using the branch target address in the BTB entry to prefetch a target instruction.

12. The method of claim 7 further comprising using a first-in, first-out replacement algorithm to load the BTB.

13. A data processing system comprising:
    a prefetch buffer having a plurality of slots for storing instructions;
    a branch target buffer (BTB) having a plurality of entries;
    a control logic unit coupled to the prefetch buffer and to the BTB, wherein the control logic unit causes an entry of the plurality of entries of the BTB to be allocated to receive a branch target address of a branch instruction if the branch instruction is not detected in a predetermined slot of the plurality of slots of the prefetch buffer.

14. The data processing system of claim 13, wherein the predetermined slot of the plurality of slots is characterized as being a first slot having an output coupled to an input of an instruction register.

15. The data processing system of claim 13, wherein a first-in, first-out replacement algorithm is used to load the BTB.

16. The data processing system of claim 13, further comprising a multiplexer having a plurality of inputs, an input of the plurality of inputs coupled to one of the plurality of entries of the BTB, and an output for providing a selected one of plurality of entries in response to a control signal.

17. The data processing system of claim 16, further comprising a comparator having a first input for receiving an address, a second input coupled to each of the plurality of entries of the BTB, and an output for providing the control signal to the multiplexer.

18. The data processing system of claim 13, further comprising:
    a program counter; and
    a branch address calculator for calculating a branch target address of the branch instruction using a value from the program counter and a displacement field of the branch instruction.

19. The data processing system of claim 13, wherein the data processing system is a pipelined data processing system implemented on a single integrated circuit.

20. The data processing system of claim 13, wherein each entry of the plurality of entries of the BTB includes a first bit field for storing an address value related to the address of the branch instruction and a second bit field for storing a branch target address.

21. The data processing system of claim 13, wherein the predetermined slot of the plurality of slots is characterized as being a second slot having an output coupled to a first slot characterized as not being coupled to an input of an instruction register.

* * * * *